United States Patent [19]

Kolaska et al.

[11] 3,999,953

[45] Dec. 28, 1976

[54] MOLDED ARTICLES MADE OF A HARD METAL BODY AND THEIR METHOD OF PRODUCTION

[75] Inventors: Johannes Kolaska, Bottrop; Heinz Röttger, Hösel, both of Germany

[73] Assignee: Fried. Krupp Gesellschaft mit beschrankter Haftung, Essen, Germany

[22] Filed: July 9, 1975

[21] Appl. No.: 594,222

[30] Foreign Application Priority Data

July 13, 1974 Germany .................... 2433737

[52] U.S. Cl. .................... 29/182.7; 75/203; 75/208 R; 148/126
[51] Int. Cl.² ........................ C22C 29/00
[58] Field of Search ........... 75/203, 204, 208 R; 148/126; 29/182.7, 182.8

[56] References Cited

UNITED STATES PATENTS

| | | | |
|---|---|---|---|
| 2,765,227 | 10/1956 | Goetzel et al. | 75/203 |
| 3,147,542 | 9/1964 | Boeckeler | 75/203 |
| 3,171,192 | 3/1965 | Ortner et al. | 75/203 |
| 3,647,576 | 3/1972 | Yamamura et al. | 75/203 |
| 3,736,107 | 5/1973 | Hale | 75/203 |

*Primary Examiner*—Brooks H. Hunt
*Attorney, Agent, or Firm*—Spencer & Kaye

[57] ABSTRACT

A molded article is provided which is comprised of (1) a core of hard metal body of at least one binder metal of iron, cobalt and nickel and at least one carbide of the elements titanium, zirconium, hafnium, vanadium, niobium, tantalum, chromium, molybdenum and tungsten, and (2) a surface layer of a hard metal on the core. The same carbides that are in the core are in the surface layer. The carbide concentration in the surface layer is greater than in the core and the carbides of the surface layer originate from the core.

A method is provided for producing such articles and comprises subjecting the core of hard metal body to a carbon monoxide-containing gas for a period of from 0.5 to 24 hours, at a temperature of from 1,000° C to 1,600° C and a pressure from 1 Torr to 1,000 Torr to form the surface layer of hard metal on the core.

8 Claims, No Drawings

MOLDED ARTICLES MADE OF A HARD METAL BODY AND THEIR METHOD OF PRODUCTION

BACKGROUND OF THE INVENTION

The present invention relates to a shaped, molded article made of a core of hard metal body and a wear-resistant, corrosion-resistant hard metal surface layer on the core and to a method for producing such an article.

It has long been known that hard metal bodies can be formed from at least one binder or bonding metal of iron, cobalt and nickel and at least one hard metal refractory carbide of at least one of the elements titanium, zirconium, hafnium, vanadium, niobium, tantalum and tungsten. The hard metal body generally is formed by uniting a powdered form of the hard metal carbide by compression with the binding metal, followed by sintering. During the sintering process, the product generally receives its final shape and dimensions and the resulting sintered product is a molded, shaped, hard metal body which often is referred to as a cemented carbide. The hard metal bodies possess great hardness and find wide application in metal turning and cutting tools which are hard enough to permit high turning and cutting speeds in rock or metal.

Increasing demands have been placed on hard metal bodies and there has been a continuing search to provide hard metal bodies having still greater wear resistance. To this end, there has been produced hard metal bodies comprising a core of a shaped, hard metal body formed from a hard metal carbide and bonding metal as described above and a surface coating of a hard material on the core. The surface coating of hard material has been made from such materials as carbides, nitrides, carbonitrides, borides and/or oxides.

Molded hard metal bodies having a core of a hard metal body and a surface coating of a hard material are known to be very hard at the surface and/or have a low tendency to heat-weld. Workpieces made of such surface-coated molded hard metal bodies are therefore very wear-resistant and have high surface hardness. The surface coating of the hard material generally is formed in such a manner that carbides, nitrides, carbonitrides, borides and oxides as well as their mixtures are deposited on the core of the hard metal body during a separate process step. For example, deposition from the gaseous phase according to the chemical vapor deposition process is a preferred method of forming a surface coating on a hard metal body. For example, titanium carbide has been deposited from the gaseous phase to form a hard metal surface coating on a core of a hard metal body.

Tools and other articles made of the known hard metal bodies coated on their surface with a hard material have the primary drawbacks that a complicated procedure is required to produce them and the surface coating often forms a bond of unsatisfactory stability with the hard metal body. In the past, the surface coatings of hard material have had a tendency to come loose from the core of hard metal body in an undesirable manner, and especially when the articles have been subjected to great toughness stress. Further, the use of such articles for turning and cutting operations is possible only within limits because the tools are subjected during this use to high impact stresses and strong alternating thermal stresses which often cause the surface coating of hard material to chip off which leads to premature failure of the tools. Hard surface coatings of a layer thickness of more than $20\mu$ have particularly poor adhesion to the underlying core of hard metal body. In practice, this means that only hard surface coatings having a layer thickness of between 5 to $10\mu$ can be used. Although the wear-resistance of a hard metal body having a surface coating of a hard material should increase with increasing layer thickness of the surface coating, hard surface coatings with a layer thickness of more than $20\mu$ generally cannot be used because under the alternating thermal stresses occurring during use in cutting and turning operations, they come off of their core of hard metal body, before they are worn out, due to lack of adhesion. Attempts have been made to overcome these drawbacks by providing metallic intermediate layers between the core and surface coating or a plurality of hard layers, but these attempts have not been entirely successful.

SUMMARY OF THE INVENTION

It is a primary object of the present invention to provide a hard metal body comprising a core of a hard metal body and a surface layer of a hard material on the core in which the surface layer has improved adhesion to the hard metal body core compared to known hard metal bodies having hard surface coatings.

Another object of the present invention is to provide a method for producing an improved hard metal body having a core of a hard metal body and a firmly adhering surface layer of a hard material on the core.

A further object of the present invention is to provide a molded hard metal body which has a wear-resistant, corrosion-resistant surface layer which can be applied in a simple manner to a core of hard metal body and which will not come loose from the core of hard metal body even under heavy toughness stresses.

Additional objects and advantages of the present invention will be set forth in part in the description which follows and in part will be obvious from the description or can be learned by practice of the invention. The objects and advantages are achieved by means of the compositions, methods, instrumentalities and combinations particularly pointed out in the appended claims.

To achieve the foregoing objects, and in accordance with its purpose, the present invention, as embodied and broadly described, provides a wear-resistant hard metal body comprising (1) a core of hard metal body made from at least one of the binder metals of iron, cobalt and nickel and at least one of the carbides of the elements titanium, zirconium, hafnium, vanadium, niobium, tantalum and tungsten and (2) a corrosion-resistant surface layer of a hard metal on the core, with the same carbides that are in the core being contained in the hard metal surface layer, and the carbide concentration in the surface layer being greater than in the core and the carbides of the surface layer originating from the core.

Preferably, the carbide concentration in the surface layer decreases from its outside, exposed surface toward the hard metal body. It is preferred that the binder metal in the core of hard metal body be cobalt.

The molded hard metal bodies of the present invention have no sharply defined phase delineations between the core of hard metal body and the surface layer on the core so that the surface layers adhere particularly well to the core. Especially desirable physical, mechanical and other properties of the molded hard metal bodies of the present invention are obtained when the hard metal surface layer has a layer thickness of from 1 to 300μ, and preferably from 5 to 50μ.

In another aspect of the present invention, a method is provided for producing the molded articles of hard metal bodies of the present invention in which a core of a hard metal body made from at least one of the binder metals of iron, cobalt and nickel and at least one of the carbides of the elements titanium, zirconium, hafnium, vanadium, niobium tantalum and tungsten is treated with a carbon monoxide-containing gas for a period of time of from 0.5 to 24 hours, at a temperature of from 1,000° to 1,600° C and a pressure from 1 Torr to 1,000 Torr to form a corrosion-resistant surface layer of a hard metal on the core, the surface layer containing the same carbides that are in the core and the carbide concentration in the surface layer being greater than in the core.

In a preferred embodiment of the process of the present invention, the carbon monoxide-containing gas is substantially free of oxygen and contains 1 to 100% carbon monoxide. The composition of the gas is substantially influenced by the quantity of carbon monoxide introduced and by the gases which may escape from the core of hard metal body during treatment with the carbon monoxide-containing gas.

In addition to carbon monoxide, the gas mixture may contain protective atmosphere gases and/or residual gases from the sintering process, such as carbon dioxide.

The carbon monoxide-containing gas treatment of the present invention can be performed during the sintering step which is used to form the core of hard metal body or can be performed after the sintering of the core of hard metal body.

Compared to the known state of the art, the present invention provides the particular advantages that the physical, mechanical and other properties of hard metal bodies provided with hard metal surface coatings are improved and that complicated surface refining processes, such as titanium carbide deposition from the gaseous phase, are not required.

The surface layer contains small amounts of binder metals, particularly cobalt, originating from the hard metal core. However, the concentration of such binder metals in the surface layer is always smaller than that in the hard metal core.

DESCRIPTION OF PREFERRED EMBODIMENTS

The production, structure and properties of hard metal bodies produced in accordance with the present invention will now be described in detail with the aid of two embodiments.

EXAMPLE 1

A turning tool which is to be used as a cutting tool is shaped from a hard metal mixture composed of 70% WC, 20% TiC+TaC and 10% Co and is degassed up to 1,200° C. Beginning at 1,200° C, the turning tool is charged with pure carbon monoxide under a pressure of 200 Torr. Sintering takes place for 1 hour at 1,450° C and, during this sintering, the turning tool is treated with carbon monoxide at a pressure of 200 Torr.

The properties of the resulting turning tool composed and produced according to the present invention are compared with the properties of a tool of the same shape and made of the same hard metal mixture, in a known manner, by sintering for 1 hour at 1,450° C without the carbon monoxide treatment of the present invention. Tests of the turning tools were made in the form of turning experiments with both a smooth and an interrupted cut, under the following conditions, producing the results listed below:

Test conditions for smooth cut:
    Material treated        : C 85 Steel
    Cutting speed           : v = 120 m/min
    Cutting depth           : a = 2 mm
    Advance                 : s = 0.25 mm/revolution
    Turning period          : T = 15 minutes
    Set angle               : K = 75°

Performance for smooth cut:
    a) Turning tool according to the present invention:
        width of flank wear   : VB = 0.71 mm
    b) Comparison turning tool
        width of flank wear   : VB = 0.83 mm Test conditions for interrupted cut:
    Material treated        : C 45 KN steel
    Turning conditions      : Four (4) rods of the
                              steel material each having a
                              diameter of 40 mm and a length
                              of 60 mm were clamped in
                              axially parallel manner, in an
                              apparatus having a hole diame-
                              ter of 190 mm. The rods were
                              face cut from the inside toward
                              the outside at:
    Cutting speed           : v = 150 m/minute
    Cutting depth           : a = 2 mm
    Advance                 : s = 0.25 mm/revolution
    Number of passes        : 100
    Number of cuts          : 65 · 10³

Performance for interrupted cut:
    a) Turning tool according to the present invention:
        width of flank wear   : VB = 0.22 mm
    b) Comparison turning tool:
        width of flank wear   : VB = 0.38 mm The turning tool produced according to the invention had a surface layer of hard material of 20 um thickness. The surface layer of hard material had the following composition: 2.5% niobium, 25% tantalum, 3% cobalt, 16.5% titanium, balance cobalt and carbon.

EXAMPLE 2

Two turning tools used as indexable inserts were produced by the conventional sintering process from a hard metal mixture of the composition of 70% WC, 20% TiC+TaC and 10% cobalt. These turning tools were subsequently heated in a furnace to 1200° C. After this temperature was reached, carbon monoxide was passed into the furnace at a pressure of 500 Torr and the turning tools were heated in the carbon monoxide atmosphere to 1400° C. The turning tools were held in the carbon monoxide atmosphere for 30 minutes at 1400° C. and 500 Torr.

The properties of one of the turning tools produced according to the invention were determined. Finally, to provide a comparison, the surface layer of the other turning tool was ground away by grinding away a thickness of 0.3 mm from the surface, and the properties of the ground turning tool were determined as comparison values. Both tools were tested in a turning experiment for a smooth cut, under the following conditions, and produced the following results:

Test conditions for smooth cut:
    Material treated        : C 85 steel
    Cutting speed           : v = 120 m/min
    Cutting depth           : a = 2 mm
    Advance                 : s = 0.25 mm/revolution
    Turning time            : T = 10 min -continued

```
Set angle              :    K = 60°

Performance for smooth cut:
  a) Turning tool according to the invention:
     Depth of crater wear  :   KT = 106µ
     Width of crater wear  :   KB = 0.70 mm
     Width of flank wear   :   VB = 0.38 mm
  b) Comparison turning tool:
     Depth of crater wear  :   KT = 169µ
     Width of crater wear  :   KB = 1.17 mm
     Width of flank wear   :   VB = 0.43 mm
```

The results of the tool tests in Examples 1 and 2 show that the molded articles of the composition according to the invention and produced according to the invention have better properties than the known molded articles so that they act more favorably with respect to wear as well as toughness stresses.

It will be understood that the above description of the present invention is susceptible to various modifications, changes and adaptations, and the same are intended to be comprehended within the meaning and range of equivalents of the appended claims.

What is claimed is:

1. A molded article comprised of (1) a core of a hard metal body of at least one of the binder metals iron, cobalt, and nickel and at least one of the carbides of the elements titanium, zirconium, hafnium, vanadium, niobium, tantalum and tungsten, and (2) a corrosion-resistant surface layer of a hard metal on the core, with the same carbides that are in the core being contained in the hard metal surface layer, the carbide concentration in the surface layer being greater than in the core and the carbides of the surface layer originating from the core.

2. The molded article as defined in claim 1 wherein the carbide concentration within the hard metal surface layer decreases from the outside of the surface layer toward the core of hard metal body.

3. The molded article as defined in claim 1 wherein the hard metal surface layer has a thickness of from 1 to 300µ.

4. The molded article as defined in claim 1 wherein the binder metal is cobalt.

5. A method for producing a molded article of a hard metal body comprising subjecting a core of a hard metal body comprised of at least one of the binder metals iron, cobalt, and nickel, and at least one of the carbides of the elements titanium, zirconium, hafnium, vanadium, niobium, tantalum and tungsten, to a carbon monoxide containing gas, for a period of time of from 0.5 to 24 hours, at a temperature from 1000° to 1600° C and a pressure from 1 to 1000 Torr to form a corrosion-resistant surface layer of a hard metal on the hard metal body core, the surface layer containing the same carbides that are in the core and the carbide concentration in the surface layer being greater than in the core and originating from the core.

6. The method as defined in claim 5 wherein the carbon monoxide containing gas is substantially free of oxygen and contains 1 to 100% carbon monoxide.

7. The method as defined in claim 5 wherein the carbon monoxide treatment takes place during sintering of the hard metal body.

8. Method as defined in claim 5 wherein the carbon monoxide treatment takes place after the core of hard metal body is sintered.

* * * * *